(12) United States Patent
Murakami et al.

(10) Patent No.: US 7,246,127 B2
(45) Date of Patent: Jul. 17, 2007

(54) RECORDING DEVICE FOR RECORDING AN INDEX FILE HAVING A HIERARCHICAL STRUCTURE OF INDEX DATA, AND RECORDING METHOD, AND RECORDING MEDIUM FOR SAME

(75) Inventors: Masaharu Murakami, Tokyo (JP); Kenichiro Aridome, Kanagawa (JP); Naoki Morimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 381 days.

(21) Appl. No.: 10/296,013

(22) PCT Filed: Mar. 7, 2002

(86) PCT No.: PCT/JP02/02118

§ 371 (c)(1),
(2), (4) Date: Nov. 20, 2002

(87) PCT Pub. No.: WO02/077865

PCT Pub. Date: Oct. 3, 2002

(65) Prior Publication Data

US 2003/0182297 A1    Sep. 25, 2003

(30) Foreign Application Priority Data

Mar. 22, 2001    (JP)    .............................. 2001-082412

(51) Int. Cl.
G06F 17/30    (2006.01)
(52) U.S. Cl. ................... 707/100; 707/102; 707/104.1; 707/200; 711/117

(58) Field of Classification Search .............. 707/1–10, 707/100–104.1, 200–206; 709/213–216; 369/44.31, 44.33, 44.38, 44.39, 13.01, 13.35; 386/32, 45; 711/117, 164; 396/32
See application file for complete search history.

(56) References Cited

U.S. PATENT DOCUMENTS 6,341,197 B1 *    1/2002    Ando et al. ................... 386/95

(Continued)

FOREIGN PATENT DOCUMENTS

EP    1085515 A2 *    3/2001

(Continued)

OTHER PUBLICATIONS

Chang et al., Integrated Image and Speech Analysis for Content-Based Video Indexing, IEEE, 1996, pp. 306-313.*

(Continued)

Primary Examiner—John E. Breene
Assistant Examiner—Jean Bolte Fleurantin
(74) Attorney, Agent, or Firm—Frommer Lawrence & Haug LLP; William S. Frommer; Paul A. Levy

(57) ABSTRACT

A recording apparatus, a recording method, a recording medium, and an electronic camera for recording an index file hierarchically stores index data of files recorded on the recording medium to the recording medium. The recording apparatus includes a device for creating an index file having areas assigned unique identifiers and a recording device for recording the index file to a recording medium. Files are recorded on the recording mediums and pieces of excerpted information of the flies are recorded to the areas. Each of the areas contains attribute information having first information and second information. The first information identifies whether the area is a folder for storing a collection of pieces of the excerpted information a stores a piece of the excerpted information, and the second information represents a folder to which the area belongs.

8 Claims, 13 Drawing Sheets

U.S. PATENT DOCUMENTS 6,771,875 B1 * 8/2004 Kunieda et al. .............. 386/46

FOREIGN PATENT DOCUMENTS

| JP | 7-84858 | 3/1995 |
| JP | 10-126738 | 5/1998 |
| WO | WO 99/17229 | 4/1999 |

OTHER PUBLICATIONS

P. Zabback et al., Office Documents on a Database Kernel—Filing, Retrieval, and Archiving, 1990, ACM, 261-270.*
A. Shoshani et al., Multidimensional Indexing and Query Coordination for Tertiary Storage Management, 1999, IEEE, 214-225.*
Chaudhuri, S. et al., Index merging, 1999, IEEE, 296-303.*

* cited by examiner

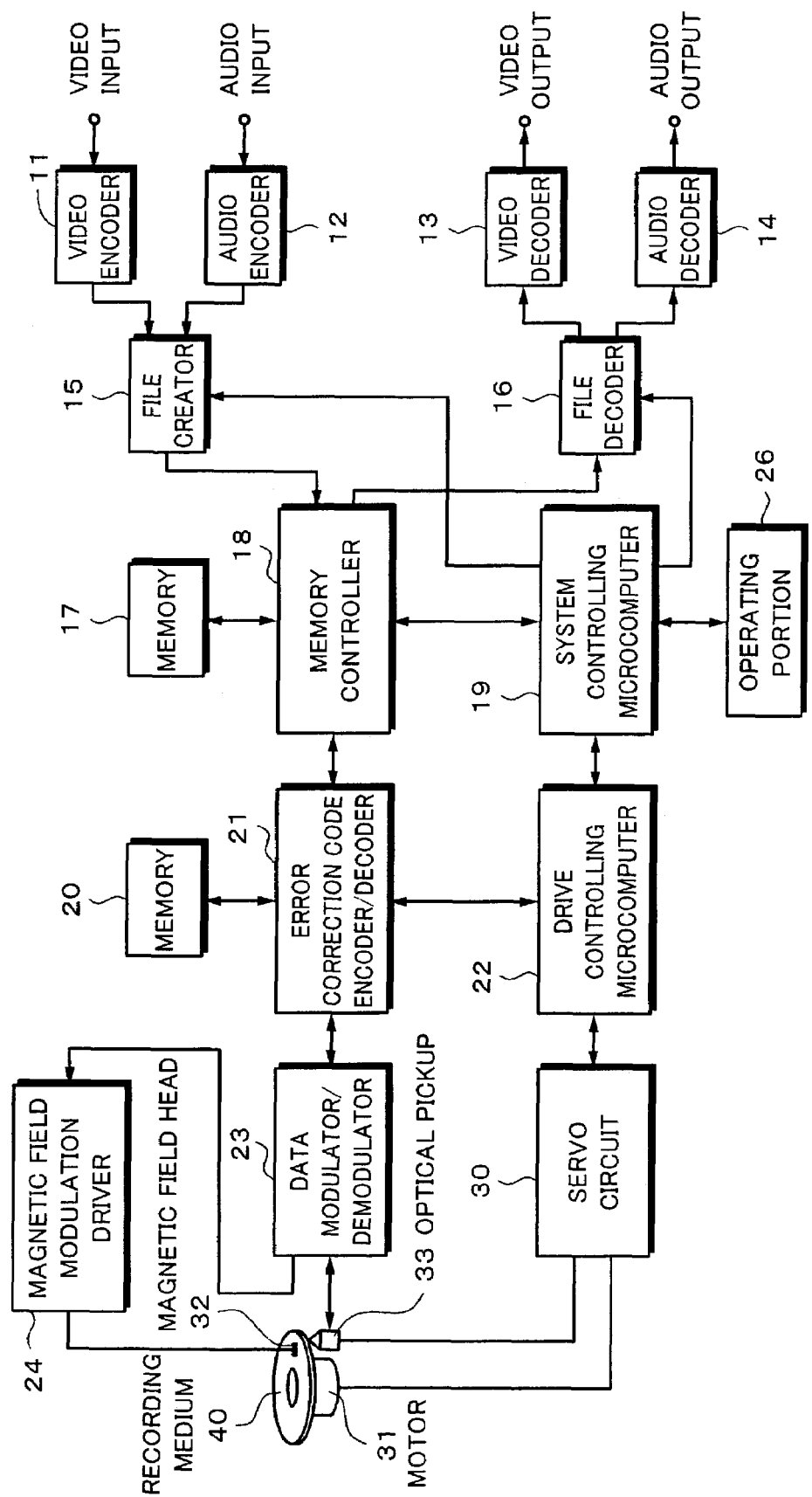

Fig. 6

| START BYTE POSITION | DATA LENGTH | FIELD NAME |
|---|---|---|
| 0 | L_PR1 | AV FILE PROPERTY #0 |
| L_PR1 | L_PR2 | AV FILE PROPERTY #1 |
| L_PR1 + L_PR2 | L_PR3 | AV FILE PROPERTY #2 |
| ⋮ | ⋮ | ⋮ |
| L_PR1 + ⋯ + L_PRn−1 | L_PRn | AV FILE PROPERTY #n |

Fig. 7

| START BYTE POSITION | DATA LENGTH | FIELD NAME |
|---|---|---|
| 0 | 4 | ENTRY NUMBER |
| 4 | 4 | FOLDER PROPERTY |
| 8 | 1 | VERSION |
| 9 | 2 | FLAG |
| 11 | 1 | DATA TYPE |
| 12 | 4 | CREATION TIME |
| 16 | 4 | MODIFICATION TIME |
| 20 | 4 | DURATION |
| 24 | VARIABLE LENGTH | FILE IDENTIFIER |

Fig. 8

| BIT | VALUE | DESCRIPTION |
|---|---|---|
| 0 | 0 | ENTRY IS FOLDER |
|   | 1 | INDEX DATA HAS BEEN REGISTERED IN ENTRY |
| 1 | 0 | ENTRY IS ORIGINAL |
|   | 1 | ENTRY IS FAVORITE |
| 2 | 0 | THERE IS NO DATA TO BE REFERENCED IN TITLE FILE OR AV FILE |
|   | 1 | THERE IS DATA TO BE REFERENCED IN TITLE FILE OR AV FILE |
| 3 | 0 | TEXT HAS NOT BEEN REGISTERED TO TITLE FILE OR AV FILE |
|   | 1 | TEXT HAS BEEN REGISTERED TO TITLE FILE OR AV FILE |
| 4 | 0 | TEXT DATA IS CONTAINED IN INDEX FILE |
|   | 1 | TEXT DATA IS CONTAINED IN TITLE FILE OR AV FILE DESIGNATED BY PROPERTY DATA |
| 5 | 0 | THUMBNAIL DATA HAS NOT BEEN REGISTERED TO TITLE FILE OR AV FILE |
|   | 1 | THUMBNAIL DATA HAS BEEN REGISTERED TO TITLE FILE OR AV FILE |
| 6 | 0 | THUMBNAIL DATA IS CONTAINED IN INDEX FILE |
|   | 1 | THUMBNAIL DATA IS CONTAINED IN TITLE FILE OR AV FILE DESIGNATED BY PROPERTY DATA |
| 7 | 0 | INTRO DATA HAS NOT BEEN REGISTERED TO TITLE FILE OR AV FILE |
|   | 1 | INTRO DATA HAS BEEN REGISTERED TO TITLE FILE OR AV FILE |
| 8 | 0 | INTRO DATA IS CONTAINED IN INDEX FILE |
|   | 1 | INTRO DATA IS CONTAINED IN TITLE FILE OR AV FILE DESIGNATED BY PROPERTY DATA |
| OTHER |   | RESERVED |

| ENTRY NUMBER | 0 | 1 | 2 | 3 | 4 | 5 | 6 | 7 |
|---|---|---|---|---|---|---|---|---|
| FLAG (0) | 0 | 1 | 1 | 0 | 0 | 1 | 1 | 1 |
| FOLDER PROPERTY | T | 0 | 0 | 0 | 3 | 3 | 4 | 4 |

; ORIGINAL FOLDER

; ORIGINAL DATA

| ENTRY NUMBER | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| FLAG (0) | 0 | 1 | 1 | 0 | 0 | 1 | 1 | 1 | 0 | 0 | 1 | 1 | 0 | 1 |
| FLAG (1) | 0 | 0 | 0 | 0 | 0 | 0 | 0 | 0 | 1 | 1 | 1 | 1 | 1 | 1 |
| FOLDER PROPERTY | T | 0 | 0 | 0 | 3 | 3 | 4 | 4 | 0 | 8 | 8 | 9 | 0 | 12 |

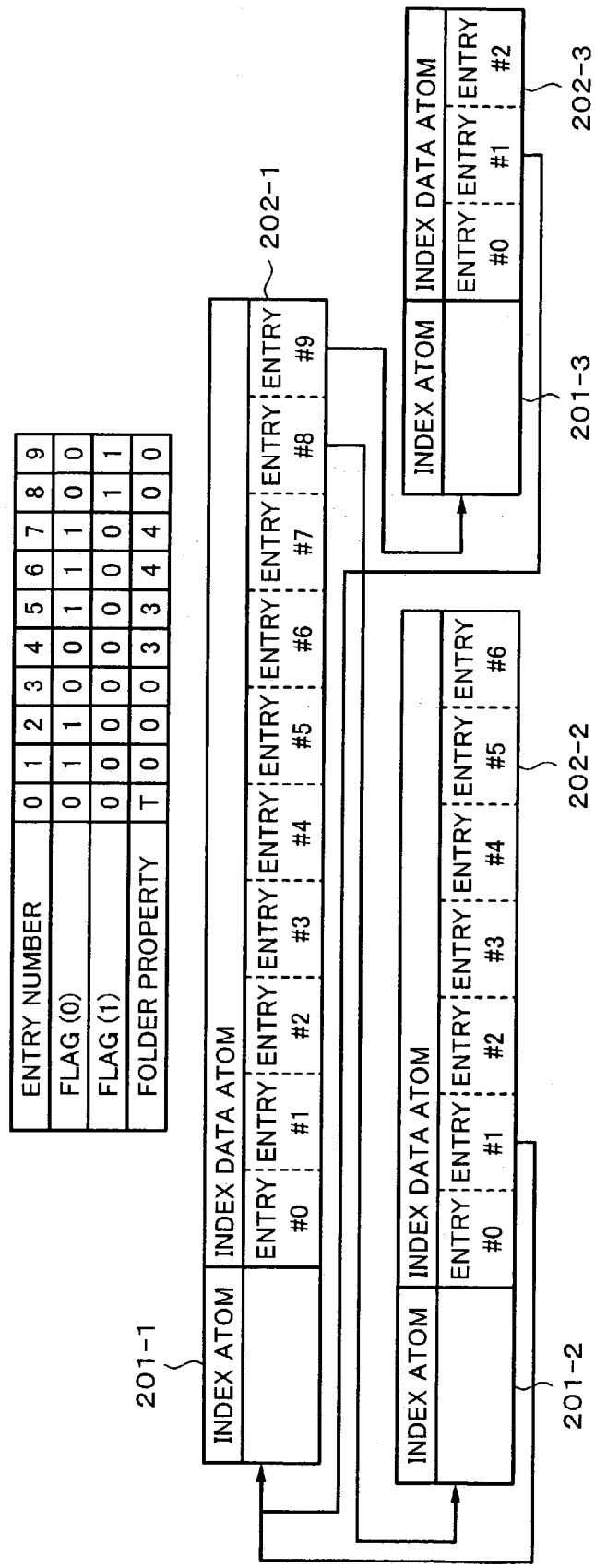

Fig. 13A

| INDEX DATA ATOM | ENTRY #0 | ENTRY #1 | ENTRY #2 | ENTRY #3 | ENTRY #4 | ENTRY #5 | ENTRY #6 | ENTRY #7 | ENTRY #8 | ENTRY #9 | ENTRY #10 | ENTRY #11 | ENTRY #12 | ENTRY #13 |
|---|---|---|---|---|---|---|---|---|---|---|---|---|---|---|

| | #0 | #1 | #2 | #3 | #4 | #5 | #6 | #7 | #8 | #9 | #10 | #11 | #12 | #13 |
|---|---|---|---|---|---|---|---|---|---|---|---|---|---|---|
| ENTRY NUMBER | 0 | 1 | 2 | 3 | 4 | 5 | 6 | 7 | 8 | 9 | 10 | 11 | 12 | 13 |
| FLAG (0) | 0 | 1 | 1 | 0 | 0 | 0 | 1 | 1 | 0 | 0 | 1 | 1 | 0 | 1 |
| FLAG (1) | 0 | 0 | 0 | 0 | 0 | 0 | 0 | 0 | 1 | 1 | 1 | 1 | 1 | 1 |
| FOLDER PROPERTY | T | 0 | 0 | 3 | 0 | 3 | 0 | 4 | 0 | 8 | 0 | 0 | 0 | 12 |

Fig. 13B

| INDEX DATA ATOM | ENTRY #0 | ENTRY #1 | ENTRY #2 | ENTRY #3 | ENTRY #4 | ENTRY #5 | ENTRY #6 | ENTRY #7 | ENTRY #8 | ENTRY #9 | ENTRY #10 |
|---|---|---|---|---|---|---|---|---|---|---|---|

| | #0 | #1 | #2 | #3 | #4 | #5 | #6 | #7 | #8 | #9 | #10 |
|---|---|---|---|---|---|---|---|---|---|---|---|
| ENTRY NUMBER | 0 | 1 | 3 | 4 | 5 | 7 | 8 | 9 | 11 | 12 | 13 |
| FLAG (0) | 0 | 1 | 0 | 0 | 1 | 1 | 0 | 0 | 1 | 0 | 1 |
| FLAG (1) | 0 | 0 | 0 | 0 | 0 | 0 | 1 | 1 | 1 | 1 | 1 |
| FOLDER PROPERTY | T | 0 | 3 | 4 | 0 | 0 | 0 | 8 | 0 | 9 | 12 |

Fig. 13C

| INDEX DATA ATOM | ENTRY #0 | ENTRY #1 | ENTRY #2 | ENTRY #3 | ENTRY #4 | ENTRY #5 | ENTRY #6 | ENTRY #7 | ENTRY #8 | ENTRY #9 | ENTRY #10 |
|---|---|---|---|---|---|---|---|---|---|---|---|

| | #0 | #1 | #2 | #3 | #4 | #5 | #6 | #7 | #8 | #9 | #10 |
|---|---|---|---|---|---|---|---|---|---|---|---|
| ENTRY NUMBER | 0 | 1 | 9 | 4 | 5 | 7 | 8 | 3 | 11 | 12 | 13 |
| FLAG (0) | 0 | 1 | 0 | 0 | 1 | 1 | 0 | 0 | 1 | 0 | 1 |
| FLAG (1) | 0 | 0 | 1 | 0 | 0 | 0 | 1 | 0 | 1 | 1 | 1 |
| FOLDER PROPERTY | T | 0 | 8 | 4 | 0 | 0 | 0 | 3 | 0 | 9 | 12 |

US 7,246,127 B2

RECORDING DEVICE FOR RECORDING AN INDEX FILE HAVING A HIERARCHICAL STRUCTURE OF INDEX DATA, AND RECORDING METHOD, AND RECORDING MEDIUM FOR SAME

BACKGROUND

1. Technical Field

The present invention relates to a recording apparatus for recording video data, audio data, and so forth to a recording medium, in particular, to a recording apparatus for recording an index file which hierarchically stores index data of recorded data of a recording medium to itself. In addition, the present invention relates to a recording method for use with such a recording apparatus and a recording medium for recording the index file. Moreover, the present invention relates to an electronic camera having such a recording apparatus.

2. Background Art

Conventionally, in a recording apparatus such as a camcorder which records video data, audio data, and so forth, a plurality of pieces of data of several scenes are recorded as files on a disc shaped recording medium such as a magneto-optical disc or an optical disc. Such a recording apparatus equipped with a display portion, such as a liquid crystal display panel or an organic electroluminescence display panel, and a sound generating portion, such as a speaker, is known as a recording and reproducing apparatus having functions for reproducing and editing recorded data.

When a recording medium for use with such a recording apparatus or a recording and reproducing apparatus has a large storage capacity, the user often records scenes photographed on different dates, scenes photographed at different places to which he or she travels, scenes photographed for different events, and other scenes to the recording medium.

With such a recording medium on which a plurality of scenes have been recorded as different files, by designating user's desired file, he or she can select his or her desired data as an object to reproduce and/or edit.

Although a desired file can be designated by inputting for example a file name, if a plurality of files, in particular, a lot of files have been recorded on a recording medium, it is difficult for the user to memorize all file names recorded on the recording medium.

To solve such a problem, an index file which stores a collection of pieces of information for identifying the contents of a plurality of files recorded on the recording medium (this collection of pieces of information is referred to as index information) is necessary. It can be supposed that the recording and reproducing apparatus displays the index file on the display portion and the user designates his or her desired file with reference to the displayed index file.

The index file is for example a file which is a collection of representative scenes of individual files, a file which is a collection of representative sounds for several seconds of individual files, a file which is a collection of representative character strings of individual files, or a file which is a collection of combinations of several of scenes, sounds, and character strings of individual files.

Even if such an index file has been recorded on the recording medium, when index information corresponding to a plurality of files is displayed on the display portion in a similar manner, it is still difficult for the user to look for his or her desired file from the plurality of files. In other words, since all the index information is handled in the same manner, although it has to be displayed at a time, the display portion has a limited display area. Thus, all the index information cannot be displayed at a time. Consequently, the recording and reproducing apparatus displays a part of the index information at a time and successively updates the displayed contents. In such a manner, the recording and reproducing apparatus displays all the index information. Thus, until the user fully looks for his or her desired file, he or she needs much labor and time. In particular, the more the record capacity increases, the more critical this problem becomes.

In addition, the user may want to manage a plurality of files recorded on a recording medium corresponding to one common factor such as each recorded date, each place to which he or she traveled, each event, or the like.

In addition, the user may want to manage a plurality of files recorded on a recording medium by creating a "favorite file list" which is a collection of scenes corresponding to his or her purpose.

SUMMARY OF THE DISCLOSURE

Therefore, an object of the present invention is to provide a recording apparatus which causes an index file to have a hierarchical structure so as to manage a collection of index information corresponding to each of common factors.

Another object of the present invention is to provide a recording apparatus which can create a favorite file list for managing index information in a managing method corresponding to a user's desired purpose while index information is being managed in the hierarchical structure.

A further object of the present invention is to provide a recording method for use with such a recording apparatus, a recording medium on which an index file has been recorded, and an electronic camera having such a recording apparatus.

The present invention is a recording apparatus comprising creating means for creating an index file having a plurality of areas assigned unique identifiers respectively and recording means for recording the index file to a recording medium, wherein the creating means is configured to correlatively store a plurality of files recorded on the recording mediums and a plurality of pieces of excerpted information thereof to the plurality of areas, and wherein each of the areas contains attribute information having first information and second information, the first information identifying whether the area is a folder for storing a collection of pieces of the excerpted information or stores a piece of the excerpted information, the second information representing a folder to which the area belongs.

The recording apparatus of the present invention may further comprise recording medium identification information storing means for storing identification information in the index file in the same format as the index file, the identification information identifying the recording medium.

In the recording apparatus of the present invention, the attribute information may further have third information, the third information identifying whether the area contains original information or favorite information, the favorite information being configured to reference original information.

In the recording apparatus of the present invention, each piece of the excerpted information may be picture data of one of the files recorded on the recording medium, audio data of one of the files recorded on the recording medium, or text data of one of the files recorded on the recording medium.

In the recording apparatus of the present invention, the index file may have a first area composed of a set of pieces of the excerpted information and a second area in which information for correlating the plurality of pieces of the excerpted information and files from which the pieces of the excerpted information have been excerpted and information representing positions at which the pieces of the excerpted information have been recorded in the first area are recorded.

The present invention is a recording method, comprising the steps of correlatively storing a plurality of files recorded on a recording medium and a plurality of pieces of excerpted information thereof to a plurality of areas assigned unique identifiers, creating an index file which stores attribute information having first information and second information, the first information identifying whether each of the areas is a folder or stores a piece of the excerpted information, the second information representing a folder to which the area belongs, and recording the created index file to the recording medium.

The present invention is a recording medium on which an index file has been recorded, a plurality of files recorded on the recording medium and a plurality of pieces of excerpted information thereof being correlatively stored to a plurality of areas assigned unique identifiers, the index file storing attribute information having first information and second information, the first information identifying whether each of the areas is a folder or stores a piece of the excerpted information, the second information representing a folder to which the area belongs.

The present invention is an electronic camera, comprising creating means for creating an index file composed of a plurality of areas assigned unique identifiers, and recording means for recording a picture signal as a file which is obtained from a photographed picture of an object and the index file to the recording medium, wherein the creating means is configured to correlatively store a plurality of files recorded on the recording medium and a plurality of pieces of excerpted information thereof to the plurality of areas, and wherein each of the areas contains attribute information having first information and second information, the first information identifying whether the area is a folder or stores a piece of the excerpted information, the second information representing a folder to which the area belongs.

Such a recording apparatus, such a recording method, and such a recording medium have an index file which stores a collection of excerpted information of a plurality of files recorded on the recording medium. Thus, a user can easily know the plurality of files recorded on the recording medium. In addition, since the index file has unique identifiers identifying a plurality of areas, first information identifying whether each area is a folder or contains excerpted information, and second information representing a folder to which each area belong using unique information. Thus, the index file can be hierarchically structured. As a result, a plurality of files can be arranged for each folder. Corresponding to an arranged folder, the user can easily and quickly search for his or her desired file.

In addition, the index file created by the recording apparatus has attribute information which contains third information identifying whether each area is original information or favorite information which references original information. Thus, the user can crate a favorite list for managing index information in a managing method corresponding to his or her purpose while the index information is being managed in the hierarchical structure.

BRIEF DESCRIPTION OF DRAWINGS

FIG. 1 is a block diagram showing an example of the structure of a digital recording and reproducing apparatus;

FIG. 6 is a schematic diagram showing an example of a track atom (property);

FIG. 7 is a schematic diagram showing an example of entity data of a property;

FIG. 8 is a schematic diagram showing an example of a flag;

FIGS. 12A and 12B are schematic diagrams showing an example of which a favorite entry is contained in another file;

FIGS. 13A, 13B, and 13C are schematic diagrams showing examples of which an entry is deleted and an entry is substituted for another entry.

DETAILED DESCRIPTION

Figure 2A:
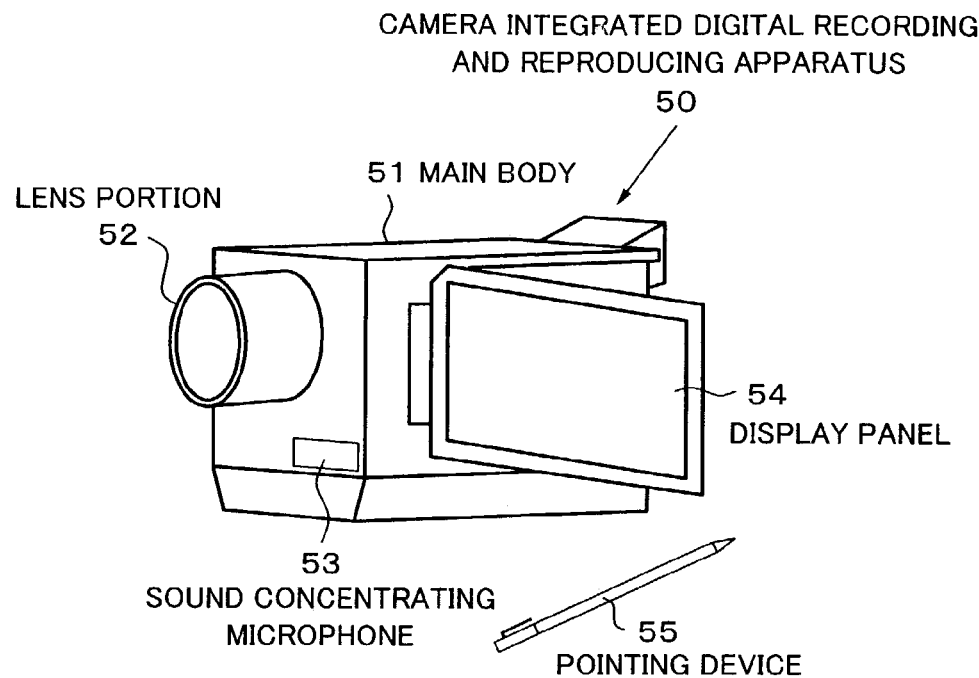
FIGS. 2A and 2B are schematic diagrams showing an appearance of a camera integrated digital recording and reproducing apparatus.

Next, with reference to the accompanying drawings, an embodiment of the present invention will be described. In each drawing, redundant description of similar structures may be omitted.

FIG. 1 is a block diagram showing an example of the structure of a digital recording and reproducing apparatus.

In FIG. 1, the digital recording and reproducing apparatus comprises a video encoder 11, an audio encoder 12, a video decoder 13, an audio decoder 14, a file creator 15, a file decoder 16, memories 17 and 20, a memory controller 18, a system controlling microcomputer 19, an error correction code encoder/decoder 21, a drive controlling microcomputer 22, a data modulator/demodulator 23, a magnetic field modulation driver 24, an operating portion 26, a servo circuit 30, a motor 31, a magnetic field head 32, and an optical pickup 33.

A video signal is input from a video input terminal. The video signal is supplied to the video encoder 11. The video encoder 11 compresses and encodes the video signal. An audio signal is input from an audio input terminal. The audio signal is supplied to the audio encoder 12. The audio encoder 12 compresses and encodes the audio signal. Output signals of the video encoder 11 and the audio encoder 12 are called elementary streams.

According to the embodiment, it is assumed that the digital recording and reproducing apparatus is disposed in a camera integrated digital recording and reproducing apparatus. The video signal is supplied as a picture photographed by the video camera. An optical system supplies photographed light of an object to an image pickup device such as CCD (Charge Coupled Device) and generates a video signal. As the audio signal, a sound collected by a microphone is supplied.

When the compressing and encoding process corresponds to the MPEG system, the video encoder 11 comprises an analog/digital converter (hereinafter abbreviated as "A/D"), a format converting portion, a screen re-arranging portion, a subtracting portion, a DCT portion, a quantizing portion, a variable length code encoding portion, a buffer memory, a rate controlling portion, an inversely quantizing portion, an inverse DCT portion, an adding portion, a frame memory, a motion compensating and predicting portion, and a switch as electronic circuits.

A video signal is supplied to the video encoder 11. The A/D digitizes the video signal. The format converting portion converts the digitized signal into a spatial resolution used in the encoding process. The spatial resolution is supplied to the screen rearranging portion. The screen re-arranging portion rearranges the sequence of pictures so that they can be properly processed in the encoding process. In other words, the screen re-arranging portion re-arranges the sequence of pictures so that after I pictures and P pictures are encoded, B pictures are encoded.

An output signal of the screen re-arranging portion is input to the DCT portion through the subtracting portion. The DCT portion performs a DCT encoding process for the signal supplied from the screen re-arranging portion. An output signal of the DCT portion is input to the quantizing portion. The quantizing portion quantizes the output signal of the DCT portion with a predetermined number of bits. An output signal of the quantizing portion is input to the variable length code encoding portion and the inversely quantizing portion. The variable length code encoding portion encodes the output signal of the quantizing portion with a variable length code such as Huffman code of which shortly occurrence data is substituted for highly occurrence codes. The encoded data is output to the buffer memory. The buffer memory outputs the encoded data as output data of the video encoder at a constant rate. Since the code amount generated by the variable length code encoding portion is variable, the rate controlling portion monitors the buffer memory and controls the quantizing operation of the quantizing portion so that a predetermined bit rate is kept.

On the other hand, since I pictures and P pictures are used as reference screens by the motion compensating and predicting portion, a signal which is input from the quantizing portion to the inversely quantizing portion is inversely quantized and then input to the inverse DCT portion. The inverse DCT portion performs the inverse DCT process for the inversely quantized signal. An output signal of the inverse DCT portion and an output signal of the motion compensating and predicting portion are added by the adding portion. The added signal is input to the frame memory. An output signal of the frame memory is input to the motion compensating and predicting portion. The motion compensating and predicting portion performs a forward prediction, a backward prediction, and a bi-directional prediction for the output signal of the frame memory. An output signal of the motion compensating and predicting portion is output to the adding portion and the subtracting portion. The inversely quantizing portion, the inverse DCT portion, the adding portion, the frame memory, and the motion compensating and predicting portion compose a local decoding portion which outputs the same decoded video signal as the video decoder does.

The subtracting portion subtracts the output signal of the screen re-arranging portion from the output signal of the motion compensating and predicting portion and obtains a predictive error between the video signal and the decoded video signal decoded by the local decoding portion. When the intra-frame encoding process is performed (namely, I pictures are supplied), the switch causes the subtracting device not to perform a subtracting process for them. In other words, the I pictures are supplied to the DCT portion.

Returning to FIG. 1, when for example MPEG/Audio layer 1/layer 2 is used, the audio encoder 12 further comprises a sub band encoding portion and an adaptive quantizing bit assigning portion as electronic circuits. The audio signal is divided into 32 sub band signals by the sub band encoding portion. The 32 sub band signals are quantized corresponding to psychological hearing sense weighting by the adaptive quantizing bit assigning portion. The quantized signal is output as a bit stream.

To improve the encoding quality, MPEG/Audio layer 3 may be used. When the MPEG/Audio layer 3 is used, the audio encoder 12 further comprises an adaptive block length modified discrete cosine transform portion, a folded distortion suppression butterfly portion, a non-linear quantizing portion, and a variable length code encoding portion.

An output signal of the video encoder 11 and an output signal of the audio encoder 12 are supplied to the file creator 15. The file creator 15 converts the video elementary stream and the audio elementary stream into file structures that a computer software program which synchronously reproduces a moving picture, sound, and text can handle without need to use a particular hardware structure. Such a computer software program is for example QuickTime (hereinafter abbreviated as "QT"). Next, the case that QT is used will be described. The file creator 15 multiplexes the encrypted video data and the encrypted audio data under the control of the system controlling microcomputer 19.

A QuickTime movie file which is output from the file creator 15 is successively written to the memory 17 through the memory controller 18. When the system controlling microcomputer 19 requests the memory controller 18 to write data to a recording medium 40, the memory controller 18 reads a QuickTime movie file from the memory 17. In addition, the system controlling microcomputer 19 stores various types of data that take place during the execution of the program to the memory 17 through the memory controller 18.

In this case, the transfer rate of an encoded QuickTime movie is designated so that it is lower than (for example, ½ of) the transfer rate of data written to the recording medium 40. Thus, although a QuickTime movie file is successively written to the memory 17, a QuickTime movie file is intermittently read from the memory 17 under the control of the system controlling microcomputer 19 so that the memory 17 neither overflow nor underflow.

The QuickTime movie file which is read from the memory 17 is supplied from the memory controller 18 to the error correction code encoder/decoder 21. The error correction code encoder/decoder 21 temporarily writes the QuickTime movie file to the memory 20 so as to generate redundant data of interleaved data and an error correction code. The error correction code encoder/decoder 21 reads the redundant data from the memory 20 and supplies the redundant data to the data modulator/demodulator 23.

When digital data is recorded to the recording medium 40, the data modulator/demodulator 23 modulates the data so that a clock can be easily extracted from the reproduced signal and no inter-code interference takes place. For example (1, 7) RLL (run length limited) code, Trellis code, and so forth can be used.

An output signal of the data modulator/demodulator 23 is supplied to the magnetic field modulation driver 24 and the optical pickup 33. The magnetic field modulation driver 24 drives the magnetic field head 32 corresponding to the input signal so as to apply a magnetic field to the recording medium 40. The optical pickup 33 radiates a recording laser beam corresponding to the input signal to the recording medium 40. In such a manner, data is recorded to the recording medium 40.

The recording medium 40 is a disc shaped recording medium, for example a rewritable optical disc such as a magneto-optical disc (MO) or a phase change type disc.

To allow an index file which will be described later to be easily read, it is preferred to record it on the substantially innermost periphery of a disc shaped recording medium (for example, a record portion immediately preceded by a lead-in portion of a CD (Compact Disc).

According to the embodiment, an MO, for example, a relatively small disc whose diameter is around 4 cm, 5 cm, 6.5 cm, or 8 cm, is used. The recording medium 40 is rotated at constant linear velocity (CLV), constant angular velocity (CAV), or zone CLV (ZCLV) by the motor 31.

The drive controlling microcomputer 22 outputs a signal to the servo circuit 30 corresponding to a request from the system controlling microcomputer 19. The servo circuit 30 controls the motor 31 and the optical pickup 33 corresponding to the output signal of the drive controlling microcomputer 22. As a result, the drive controlling microcomputer 22 controls the entire drive. For example, the servo circuit 30 performs a radius traveling servo operation, a tracking servo operation, and a focus servo operation for the recording medium 40 and controls the rotations of the motor 31.

The operating portion 26 is connected to the system controlling microcomputer 19. The user can input a predetermined command to the system controlling microcomputer 19 through the operating portion 26.

In the reproduction mode, the optical pickup 33 radiates a laser beam having a reproduction output level to the recording medium 40. The optical detector of the optical pickup 33 receives the reflected light as a reproduction signal. In this case, the drive controlling microcomputer 22 detects a tracking error and a focus error from an output signal of the optical detector of the optical pickup 33. The servo circuit 30 controls the optical pickup 33 so that the reading laser beam is at a predetermined track and focuses thereon. In addition, the drive controlling microcomputer 22 controls the traveling in the radius direction of the optical pickup so as to reproduce data at a desired position on the recording medium 40. Like the record mode, the desired position is determined by the system controlling microcomputer 19 in such a manner that it supplies a predetermined signal to the drive controlling microcomputer 22.

A signal reproduced by the optical pickup 33 is supplied to the data modulator/demodulator 23. The data modulator/demodulator 23 demodulates the reproduced signal. The demodulated data is supplied to the error correction code encoder/decoder 21. The reproduced data is temporarily stored in the memory 20. The error correction code encoder/decoder 21 performs a de-interleaving process and an error correcting process for the demodulated data. The QuickTime movie file which has been error corrected is stored in the memory 17 through the memory controller 18.

The QuickTime movie file stored in the memory 17 is output to the file decoder 16 corresponding to a request from the system controlling microcomputer 19. The system controlling microcomputer 19 monitors the data amount of the reproduction signal reproduced from the recording medium 40 and stored in the memory 17 and the data amount of the data which is read from the memory 17 and supplied to the file decoder 16 and controls the memory controller 18 and the drive controlling microcomputer 22 so that the memory 17 neither overflow nor underflow. In such a manner, the system controlling microcomputer 19 intermittently reads data from the recording medium 40.

The file decoder 16 separates the QuickTime movie file into a video elementary stream and an audio elementary file under the control of the system controlling microcomputer 19. The video elementary stream is supplied to the video decoder 13. The video decoder 13 decodes the video elementary stream which has been compressed and encoded. The decoded video data is output from a video output terminal. The audio elementary stream is supplied to the audio decoder 14. The audio decoder 14 decodes the audio elementary stream which has been compressed and encoded. The decoded audio data is output from an audio output terminal. The file decoder 16 synchronously outputs the video elementary stream and the audio elementary stream.

When the video decoder 13 corresponds to the MPEG system, the video decoder 13 comprises a buffer memory, a variable length code decoding portion, an inversely quantizing portion, an inverse DCT portion, an adding portion, a frame memory, a motion compensating and predicting portion, a screen rearranging portion, and a digital/analog converter (hereinafter abbreviated as "D/A") as electronic circuits. A video elementary stream is temporarily stored in the buffer memory. Thereafter, the video elementary stream is input to the variable length code decoding portion. The variable length code decoding portion decodes macro block encoded information and separates it into a predicting mode, a moving vector, quantizer information, and quantized DCT coefficients. The inversely quantizing portion de-quantizes the quantized DCT coefficients into DCT coefficients. The inverse DCT portion coverts the DCT coefficients into pixel spatial data. The adding portion adds an output signal of the inverse DCT portion and an output signal of the motion compensating and predicting portion. However, when an I picture is decoded, the adding portion does not add these output signals. All macro blocks of the screen are decoded. The screen rearranging portion re-arranges the decoded macro blocks in the original input sequence. The D/A converts the re-arranged data into an analog signal and outputs the converted analog signal. Since an I picture and a P picture are used as reference screens in the decoding process which follows, they are stored in the frame memory. The I picture and the P picture are output to the motion compensating and predicting portion.

When MPEG/Audio layer 1/layer 2 is used, the audio decoder 14 comprises a bit stream disassembling portion, an inversely quantizing portion, and a sub band combining filter bank portion as electronic circuits. An input audio elementary stream is supplied to the bit stream disassembling portion. The bit stream disassembling portion separates the input audio elementary stream into a header, auxiliary information, and a quantized sub band signal. The inversely quantizing portion inversely quantizes the quantized sub band signal with a predetermined number of bits which has been assigned. The sub band combining band filter combines the inversely quantized data and outputs the combined data.

Next, a camera integrated digital recording and reproducing apparatus which is equipped with the recording and reproducing apparatus according to the present invention will be described.

Figure 2B:
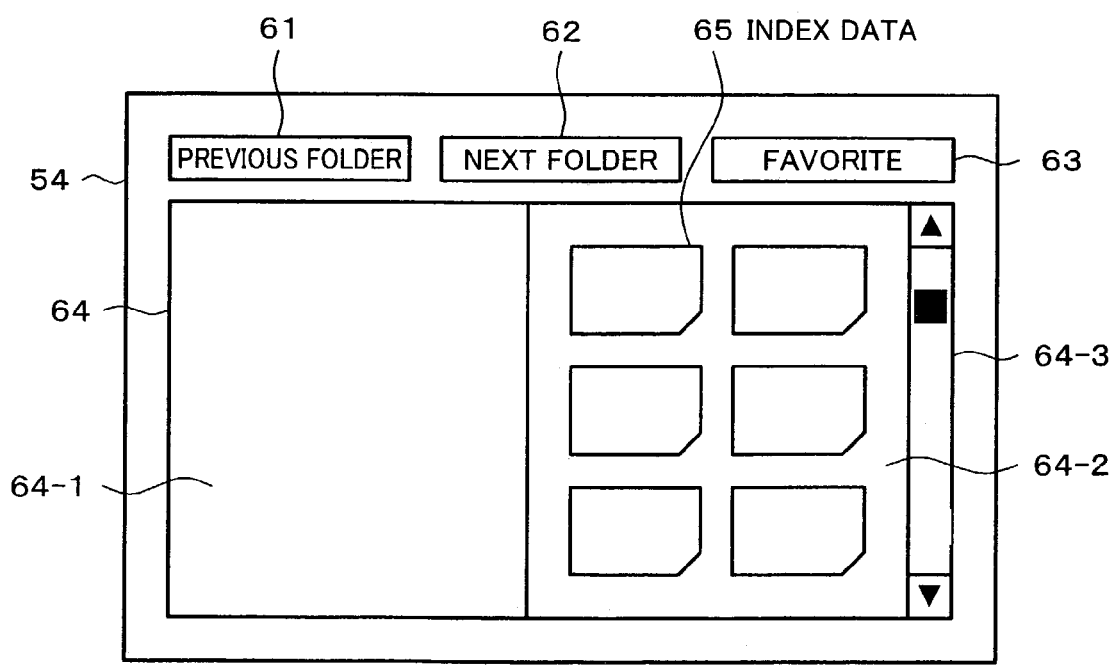

FIGS. 2A and 2B are schematic diagrams showing an appearance of a camera integrated digital recording and reproducing apparatus. FIG. 2A is an overall view showing the camera integrated digital recording and reproducing apparatus. FIG. 2B is a schematic diagram showing an example of a display of a display panel.

In FIG. 2A, the camera integrated digital recording and reproducing apparatus 50 comprises a main body 51, a lens portion 52, a sound concentrating microphone 53, and a display panel 54.

The digital recording and reproducing apparatus shown in FIG. 1 is disposed in the main body 51. Photographed light of an object is supplied from an optical system of the lens portion 52 to an image pickup device. The image pickup device generates a video signal corresponding to the photographed light. An audio signal is generated by the sound concentrating microphone 53. The display panel 54 is composed of a liquid crystal display and a piezoelectric device. The display panel 54 displays a reproduced picture and data corresponding to an operation of the apparatus. When the user inputs a desired operation command to the apparatus, he or she presses the display portion with a pointing device 55.

As shown in FIG. 2B, the display panel 54 is shared by an operation command input portion and an operation content display portion. The display panel 54 has a "previous folder" 61, a "next folder" 62, a "favorite" 63, and a main display area 64. The main display area 64 has a reproduction area 64-1 for displaying a reproduced picture, an index area 64-2 for displaying index data 65, and a scroll bar 64-3 for scrolling index data.

Normally, a reproduced picture (moving picture or still picture) displayed in the reproduction area 64-1 is a file corresponding to index data designated from a plurality of pieces of index data displayed in the index area 64-2 (in FIG. 2B, six pieces of index data).

Index data is a disc title or excerpted information of an AV file. A disc title is identification information identifying the recording medium.

When the "previous folder" 61 is pressed with the pointing device 55 or the like, a folder or a content of a file which is earlier by one in the history of folders and/or files designated by the user than a folder or a content of a file which has been currently designated is displayed in the reproduction area 64-1.

When the "next folder" 62 is pressed with the pointing device 55 or the like, a folder or a content of a file which is later by one in the history of folders and/or files designated by the user than a folder or a content of a file which has been currently designated is displayed in the reproduction area 64-1.

Whenever the "favorite" 63 is pressed with the pointing device 55 or the like, an original index is changed to a favorite index or vice versa in the index area 64-2.

When a recording medium is formatted or after a picture is photographed, the camera integrated digital recording and reproducing apparatus 50 creates a disc title and excerpt information of a file and records them as an index file. The index file serves to manage a disc title and excerpted information of a file with a hierarchical file system. The index file according to the present invention is created so that an application program manages a plurality of files recorded on the recording medium besides the FAT (File Allocation Table) and the UDF (Universal Disk Format) the OS (Operating System) uses for a flexible disk and a hard disk and for a CD-R/RW and a DVD, respectively, to manage a plurality of files recording on the recording medium. According to the embodiment, an index file is created in the format of for example a QuickTime movie file. Since an index file is created in the format of a QuickTime movie file, a plurality of types of entity data such as video data and audio data, excerpted information of a file, and a disc title can be recorded in the same format. Thus, the recoding and reproducing apparatus can reproduce all types of data on QT.

Next, a QuickTime movie file will be described in brief. QT is a software program which manages various types of data along the time base and which has an OS extension function for synchronously reproducing a moving picture, a sound, a text, and so forth without need to use a special hardware device. QT has been disclosed in for example "Inside Macintosh: QuickTime (Japanese Edition)," Addison Wesley.

A basic data unit of a QT movie resource is called an atom. Each atom contains a size and type information along with entity data. In QT, the minimum unit of data is treated as a sample. As a set of samples, a chunk is defined.

Figure 3:
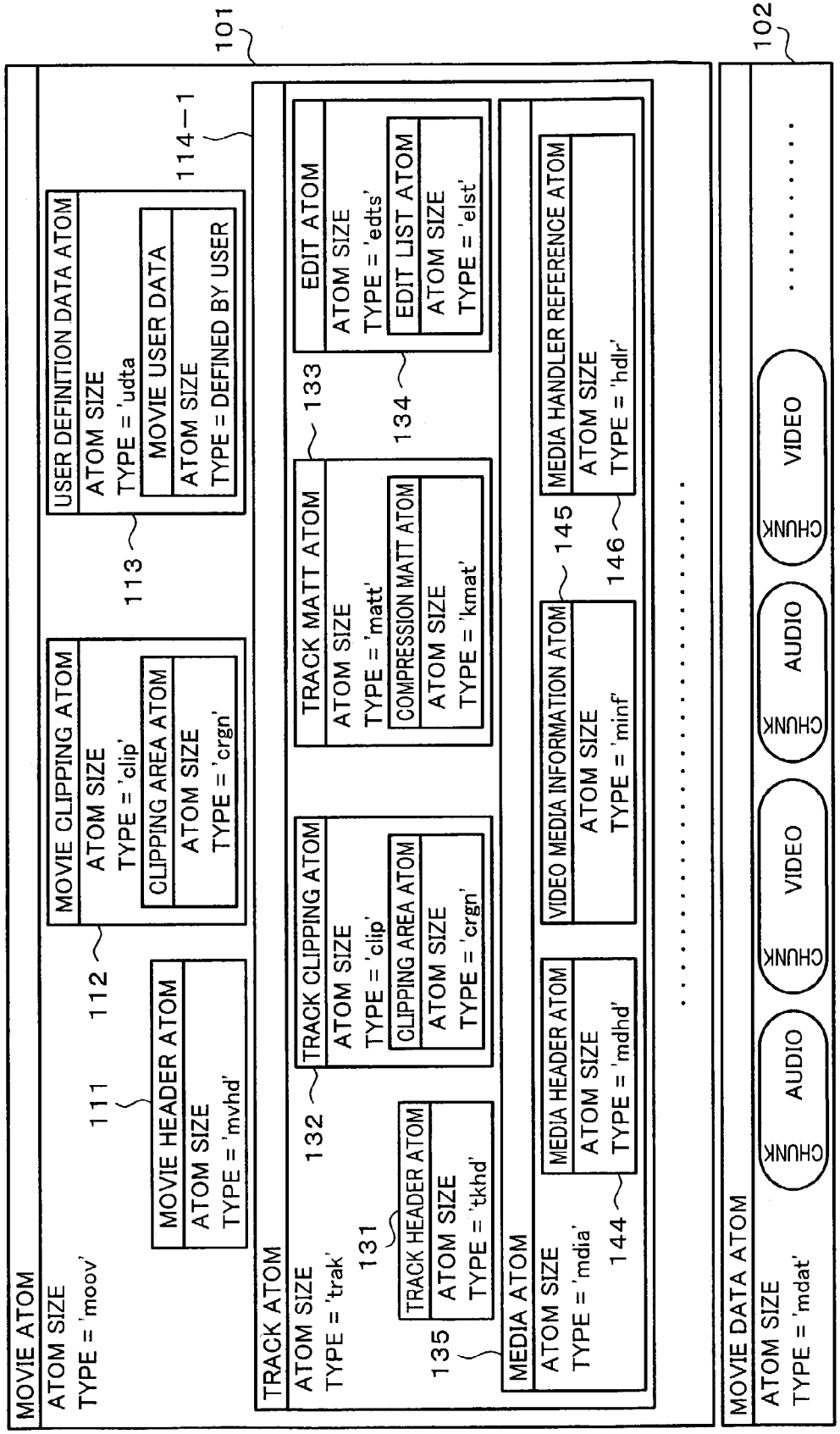
FIG. 3 is a schematic diagram showing an example of the structure of a QuickTime movie file.

FIG. 3 is a schematic diagram showing an example of the structure of a QuickTime movie file.

Figure 4:
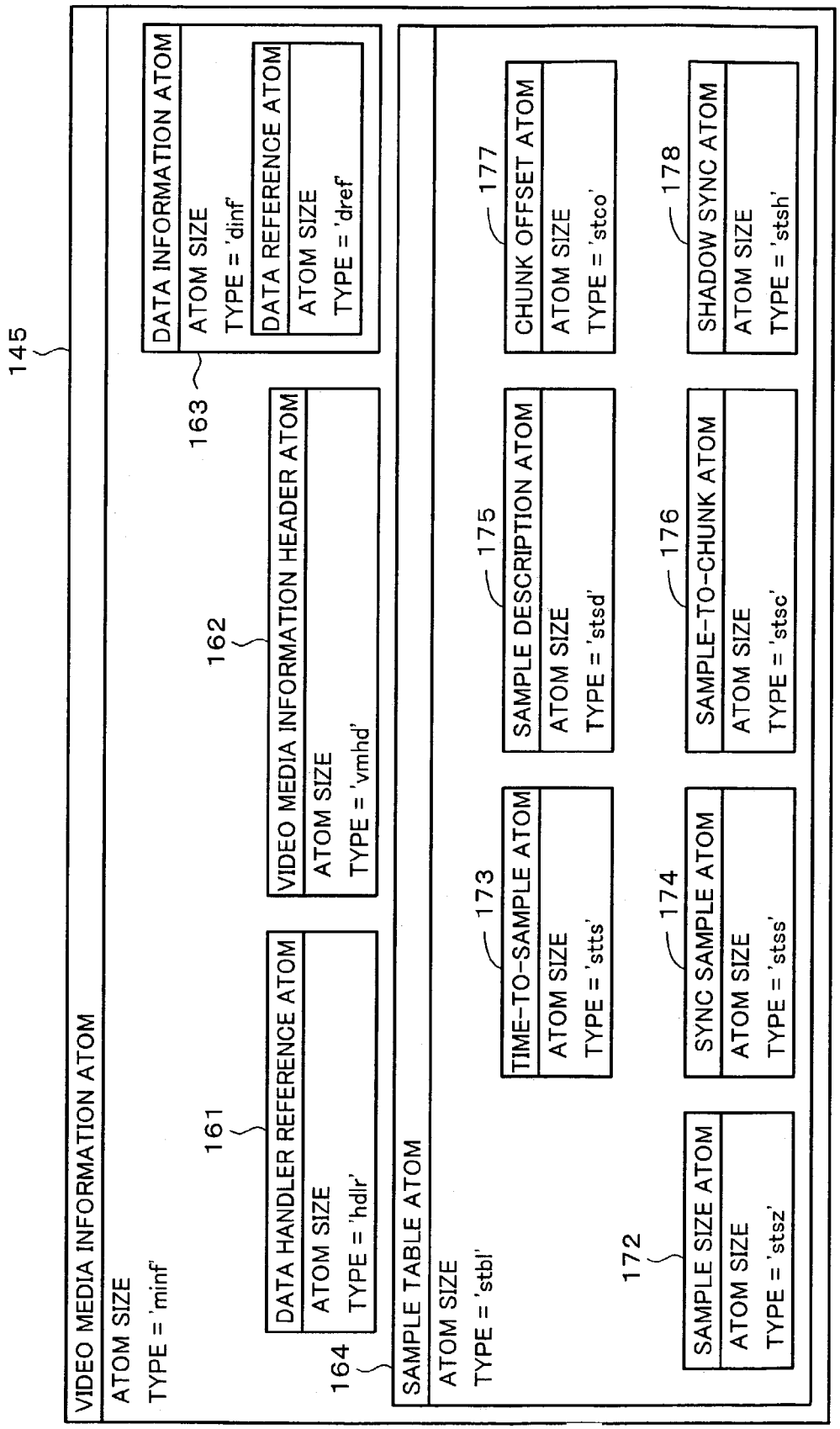
FIG. 4 is a schematic diagram showing an example of the structure of a video media information atom.

FIG. 4 is a schematic diagram showing an example of the structure of a video media information atom. FIG. 4 is a detailed schematic diagram showing the video media information atom shown in FIG. 3 in the case that tracks are video information.

In FIGS. 3 and 4, a QuickTime movie file is mainly composed of two portions which are a movie atom 101 and a movie data atom 102. The movie atom 101 is a portion which contains information necessary for reproducing a file and information necessary for referencing entity data. The movie data atom 102 is a portion which contains entity data such as video data and audio data.

The movie atom 101 contains a movie header atom 111, a movie clipping atom 112, a user definition data atom 113, at least one track atom 114, and so forth. The movie header atom 111 contains information with respect to the entire movie. The movie clipping atom 112 designates a clipping area.

The track atom 114 is provided for each track of a movie. The track atom 114 contains a track header atom 131, a track clipping atom 132, a track matte atom 133, an edit atom 134, and a media atom 135. The track atom 114 describes information with respect to individual pieces of data of the movie data atom 102 in the atoms 131 to 135. FIG. 3 shows only a track atom 114-1 of a video movie (omitting other track atoms).

The media atom 135 contains a media header atom 144, a media information atom (video media information atom 145 in FIGS. 3 and 4), and a media handler reference atom 146. The media atom 135 describes information which defines components for interpreting data of a movie track and media data in the media header atom 144, the media information atom, and the media handler reference atom 146.

The media handler maps a media time to media data using the information of the media information atom.

The media information atom 145 contains a data handler reference atom 161, a media information header atom 162, a data information atom 163, and a sample table atom 164.

The media information header atom (a video media information header atom 162 in FIG. 4) describes information with respect to media. The data handler reference atom 161 describes information with respect to handling of media data. The data handler reference atom 161 contains information which designates a data handler component which provides an access means for media data. The data information atom 163 contains a data reference atom. The data reference atom describes information with respect to data.

The sample table atom 164 contains information necessary for converting a media time into a sample number which represents a sample position. The sample table atom 164 is composed of a sample size atom 172, a time-to-sample atom 173, a sync sample atom 174, a sample description atom 175, a sample-to-chunk atom 176, a chunk offset atom 177, and a shadow sync atom 178.

The sample size atom 172 describes the size of a sample. The time-to-sample atom 173 describes the relation between samples and time base (how many seconds and minutes of data have been recorded?). The sync sample atom 174 describes information with respect to synchronization and designates a key frame of media. A key frame is a self included frame which does not depend on the preceding frame. The sample description atom 175 contains information necessary for decoding a sample of media. Media can have at least one sample description atom corresponding to a compression type used in the media. With reference to a table contained in the sample description atom 175, the sample-to-chunk atom 176 identifies a sample description corresponding to each sample of media. The sample-to-chunk atom 176 describes the relation between samples and chunks. The sample-to-chunk atom 176 identifies the position of a sample of media corresponding to information of the beginning chunk, the number of samples per chunk, and a sample description ID. The chunk offset atom 177 describes the start bit position of a chunk of movie data and defines the position of each chunk of a data stream.

In FIG. 3, the movie data atom 102 contains audio data encoded corresponding to a predetermined compressing and encoding system and video data encoded corresponding to a predetermined compressing and encoding system in the unit of a chunk composed of a predetermined number of samples. It is not always necessary to compress and encode data. Instead, linear data can be contained. For example, when text data, MIDI, or the like is handled, the movie data atom 102 contains entity data of text, MIDI, or the like. Correspondingly, the movie atom 101 contains a text track, an MIDI track, or the like.

Each track of the movie atom 101 is correlated with data contained in the movie data atom 102.

With such a hierarchical structure, when data contained in the movie data atom 102 is reproduced, QT successively traces the hierarchical structure from the movie atom 101, maps a sample table to memory corresponding to the atoms 172 to 178 contained in the sample table atom 164, and identifies the relation of each piece of data. QT reproduces data corresponding to the relation of each piece of data.

QT has such a data structure. Thus, in the index file according to the embodiment, entity data of a disc title and entity data of excerpted information of the file are contained in the movie data atom. Management information of these entity data is contained in the movie atom. In addition, these entity data is managed in a hierarchical tree structure having a plurality of folders (directories). Hereinafter, the movie data atom of the index file is called index data atom. The movie atom is called index atom.

The index file depends on data handled in a file recorded on a recording medium. According to the embodiment, however, it is assumed that types of data of a file are video data and audio data. Hereinafter, such a file is abbreviated as "AV file".

When an AV file has been recorded on a recording medium, the index file contains for example four types of data which are a property, a text, a thumbnail picture, and an intro. A property is data which represents attributes of a disc title and each AV file. Thus, in the index file, only the property, which contains attribute information, is necessary.

Text data is data which represents a character string of a disc title or a title of each AV file.

Thumbnail picture data is data of one picture which is representative of a disc title or each AV file. The user can freely assign a thumbnail picture of a disc title. Alternatively, for example, video data contained in the second entry area of the index file can be automatically assigned as thumbnail picture data of the disc title. Likewise, the user can freely assign a thumbnail picture of each AV file. Alternatively, for example, the first video data of each AV file can be automatically assigned as thumbnail picture data thereof.

Intro data is audio data of a short period which is representative of a disc title or each AV file. The user can freely assign an intro of a disc title. Alternatively, for example, audio data contained in the second entry area of the index file may be automatically assigned as intro data. Likewise, the user can freely assign an intro of each AV file. Alternatively, audio data of the first several seconds, for example five seconds, of each AV file may be assigned as an intro thereof.

When necessary, in consideration of the searching efficiency, areas for a text, a thumbnail picture, and an intro may be provided in the index file. Although data of a property should be registered, even if the areas for a text, thumbnail picture data, and intro data have been allocated, it is not always necessary to register all data of a test, a thumbnail picture, and an intro.

Figure 5:
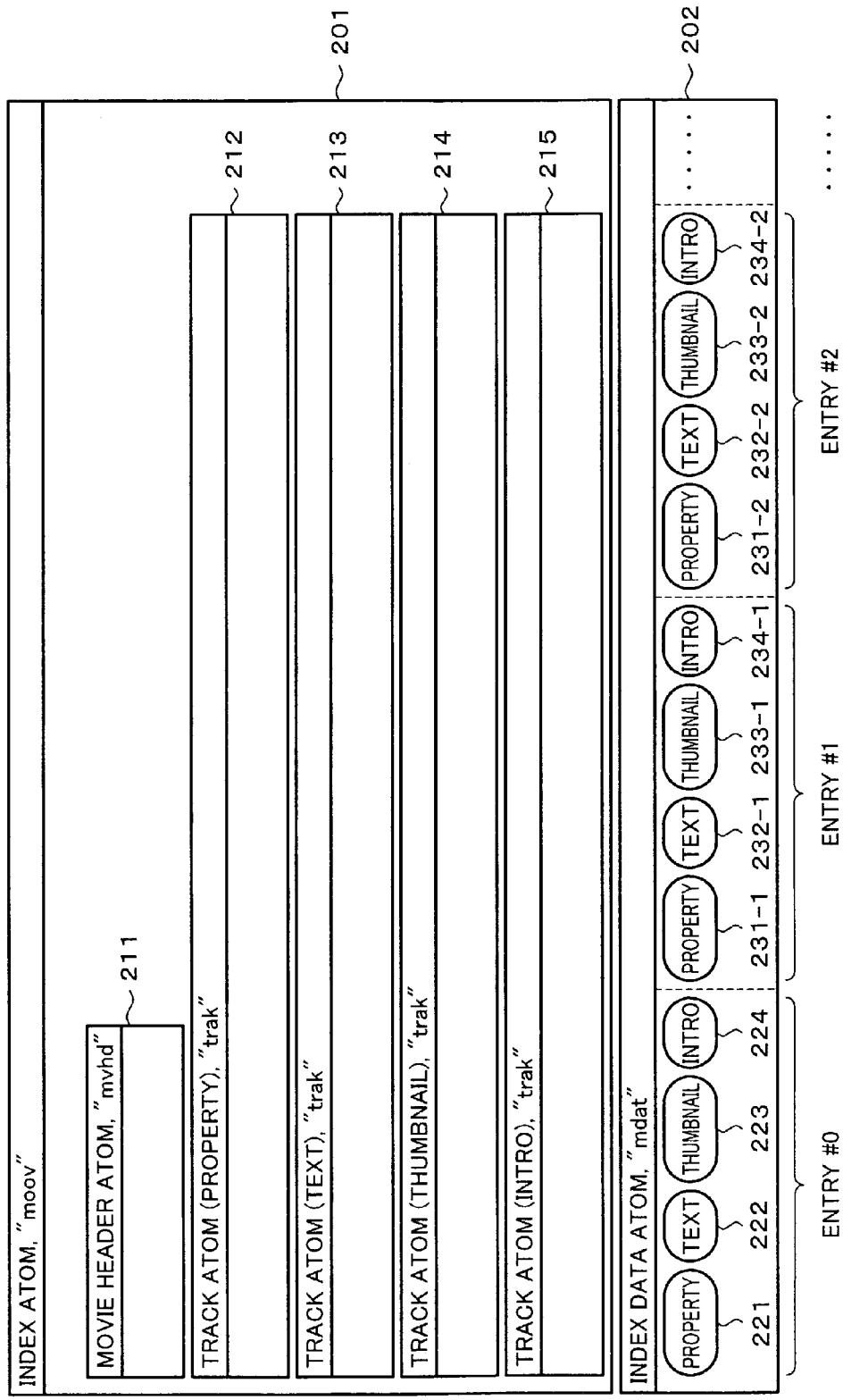
FIG. 5 is a schematic diagram showing an example of an index file created using QuickTime movie files.

FIG. 5 is a schematic diagram showing an example of an index file created with a QuickTime movie file.

In FIG. 5, an index file is composed of an index atom 201 and an index data atom 202.

The index data atom 202 contains entity data of a property, a text, a thumbnail picture, and an intro. Entity data 221, 222, 223, and 224 of the property, the text, the thumbnail picture, and the intro of the disc title are contained in a first area, entry #1, of the index data atom 202. Entity data 231, 232, 233, and 234 of the property, the text, the thumbnail picture, and the intro of each AV file are contained in second or later area, one of entry #2 to entry #n (where n is any integer which is two or larger) of the index data atom 202.

The index atom 201 is composed of a movie header atom 211, a track atom (property) 212, a track atom (text) 213, a track atom (thumbnail picture) 214, and a track atom (intro) 215 corresponding to entity data of the property, the text, the thumbnail picture, and the intro, respectively.

In addition, as was described above, only the track atom (property) 212 and the entity data 221 and 231 of the properties are essential.

FIG. 6 is a schematic diagram showing an example of the track atom (property).

In FIG. 6, the track atom (property) 212 has a format of a table which correlates AV file property #0, AV file property #1, AV file property #2, ..., AV file property #n defined as chunks of property data of the disc title and each AV file, data lengths L_PR1, L_PR2, ..., L_PRn, and start byte positions 0, L_PR1, L_PR1+L_PR2, ..., L_PR+1+...+L_PRn−1. The data length is for example a variable length in the unit of a byte.

FIG. 7 is a schematic diagram showing an example of entity data of a property.

In FIG. 7, each of entity data 221 and 231 of properties is composed of an entry number, a folder property, a version, a flag, a data type, a creation time, a modification time, a duration, and a file identifier.

The entry number starts from 0 and a unique number assigned to each entry. In other words, the entry number is an identifier which identifies an entry. The entry number represents in what entry the entity data of the property is contained. The entry number is four-byte data which starts from the 0-th byte. As long as the entry number can identify an entry contained in the index data atom, the entry number may be an alphabetic character.

The folder property is an entry number to which the entry belongs. When the entry contains information of a disc title, since the entry is "root" which is a folder in the highest hierarchy level, an identifier which represents the "root" is assigned. The identifier which represents the "root" may be assigned for example entry number 0 in which the disc title is contained, a special identifier (for example, "T", "D", or "M"), or the maximum entry number because it is supposed that the maximum entry number is hardly ever used. According to the embodiment, "T" is assigned to the identifier which represents the "root." Alternatively, a program may be created so that the folder property of the disc title is not defined and when the entry is the disc title, the folder property is not referenced. The folder property is four-byte data which starts from byte 4. A folder is a means for grouping a plurality of files. In a folder, not only a file, but another folder can be registered.

The version is one-byte data which starts from byte 8. The flag is two-byte data which starts from byte 9. The data type represents the type of data (moving picture, still picture, audio, or the like) of a title file or an AV file corresponding to the property. The data type is one-byte data which starts from byte 11. A title file is a file which contains a disc title. The creation time represents the date and time on and at which a title file or an AV file corresponding to the property was created. The creation time is four-byte data which starts from byte 12. The modification time represents the date and time on and at which a title file or an AV file corresponding to the property was modified. The modification time is four-byte data which starts from byte 16. The duration represents a time period necessary for reproducing a title file or an AV file corresponding to the property. The duration is four-byte data which starts from byte 20. The file identifier represents a file name of a title file or an AV file corresponding to the property. The file identifier is variable length data which starts from byte 24.

In FIG. 8, the flag is composed of 16 bits. The attribute of an entry and favorites are represented with "0" and "1" of each bit of the flag.

The bit 0 of the flag (hereinafter abbreviated as "flag (0)") represents the attribute of the entry. When the entry is a folder, the bit 0 of the flag is 0. When the entry is index data, the bit 0 of the flag is 1.

The bit 1 of the flag (hereinafter abbreviated as "flag (1)") represents whether the entry is an original index or a favorite index. When the entry is an original index, the bit 1 of the flag is 0. When the entry is a favorite index, the bit 1 of the flag is 1. An original index is an entry which is collected as an index file at first. A favorite index is an entry which is intentionally collected from entries which have been registered corresponding to user's purpose. For example, in the case that an original index of which a plurality of pieces of index data of a plurality of files have been stored in folders created in the order of recorded dates is present in an index file, a favorite index is a collection of index data of user's favorite files, a collection of index data of files of his or her children, or a collection of index data of files of his or her sweetheart. The favorite index is contained in the index file along with the original index. Alternatively, the favorite file may be contained in a file instead of the index file.

When there is no data to be referenced in a title file or an AV file, the bit 2 of the flag is 0. When there is data to be referenced in a tile or an AV file, the bit 2 of the flag is 1.

When text data has not been registered to a tile file or an AV file, the bit 3 of the flag is 0. When text data has been registered to a title file or an AV file, the bit 3 of the flag is 1. When text data is contained in the index file, the bit 4 of the flag is 0. When text data is contained in a title file or an AV file designated by the property data, the bit 4 of the flag is 1.

When thumbnail picture data has not been registered to a title file or an AV file, the bit 5 of the flag is 0. When thumbnail picture data has been registered to a title file or an AV file, the bit 5 of the flag is 1. When thumbnail picture data is contained in the index file, the bit 6 of the flag is 0. When thumbnail picture data is contained in a title file or an AV file designated by the property data, the bit 6 of the flag is 1.

When intro data has not been registered to a title file or an AV file, the bit 7 of the flag is 0. When intro data has been registered to a title file or an AV file, the bit 7 of the flag is 1. When intro data is contained in the index file, the bit 8 of the flag is 0. When intro data is contained in a title file or an AV file designated by the property data, the bit 8 of the flag is 1.

The bit 9 to the bit 15 of the flag are reserved bits so that the flag has flexibility.

The index file hierarchically manages the index data with the entry number, the folder property, and the entry attribute.

Next, a real example of the relations between the entry number, the folder property and the entry attribute and the hierarchical structure of the index data will be described.

Figures 9A, 9B:
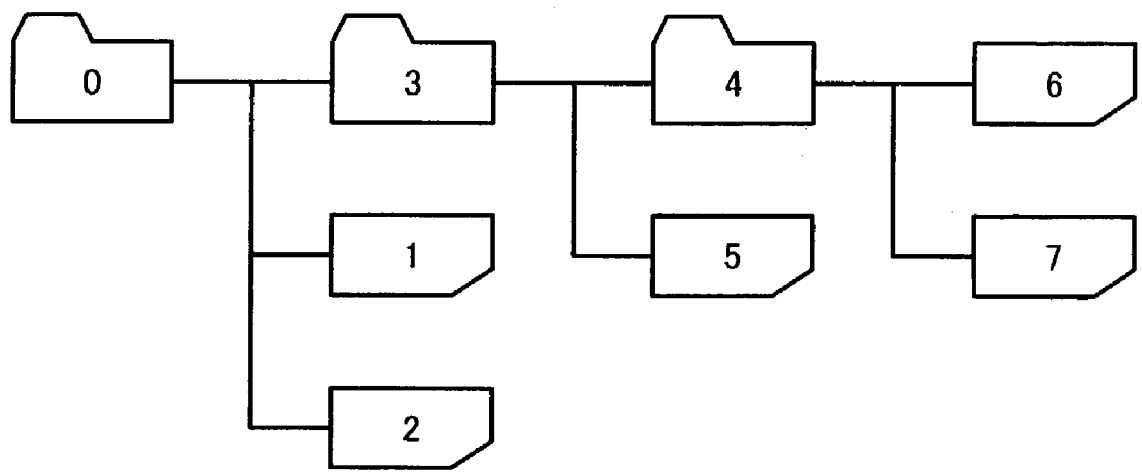
FIGS. 9A and 9B are schematic diagrams showing an example of information of a property and an example of the structure of index data.

FIGS. 9A and 9B are schematic diagrams showing an example of information of a property and the structure of index data. FIG. 9A shows the relations of the entry number, the flag (0), and the folder property. FIG. 9B shows the structure of an original index of index data.

In FIG. 9, when the entry number is 0, the flag (0) is 0 and the folder property is T. Since the flag (0) is 0, the entry number 0 is a folder. Since the folder property is T, the entry number 0 is a disc title as a root.

When the entry number is 1, the flag (0) is 1 and the folder property is 0. Since the flag (0) is 1, the entry number 1 is index data. Since the property data is 0, the entry number 1 belongs to the root.

When the entry number is 2, the flag (0) is 1 and the folder property is 0. Since the flag (0) is 1, the entry number 2 is index data. Since the folder property is 0, the entry number 2 belongs to the root.

When the entry number is 3, the flag (0) is 0 and the folder property is 0. Since the flag (0) is 0, the entry number 3 is a folder. Since the folder property is 0, the entry number 3 belongs to the root.

Thus, the root contains the entry number 1, which is an entry, the entry number 2, which is an entry, and the entry number 3, which is a folder.

When the entry number is 4, the flag (0) is 0 and the folder property is 3. Since the flag (0) is 0, the entry number 4 is a folder. Since the folder property is 3, the entry number 4 belongs to the entry number 3, which is a folder.

When the entry number is 5, the flag (0) is 1 and the folder property is 3. Since the flag (0) is 1, the entry number 5 is index data. Since the folder property is 3, the entry number 5 belongs to the entry number 3, which is a folder.

When the entry number is 6, the flag (0) is 1 and the folder property is 4. Since the flag (0) is 1, the entry number 6 is index data. Since the folder property is 4, the entry number 6 belongs to the entry number 4, which is a folder.

When the entry number is 7, the flag (0) is 1 and the folder property is 4. Since the flag (0) is 1, the entry number 7 is index data. Since the folder property is 4, the entry number 7 belongs to the entry number 4, which is a folder.

Thus, the entry number, the flag (0), the folder property shown in FIG. 9A represent that the index data has a hierarchical structure shown in FIG. 9B.

A favorite folder in which only entries are collected from original entries corresponding to user's purpose is feasible with the bit 1 of the flag.

Figures 10A, 10B:
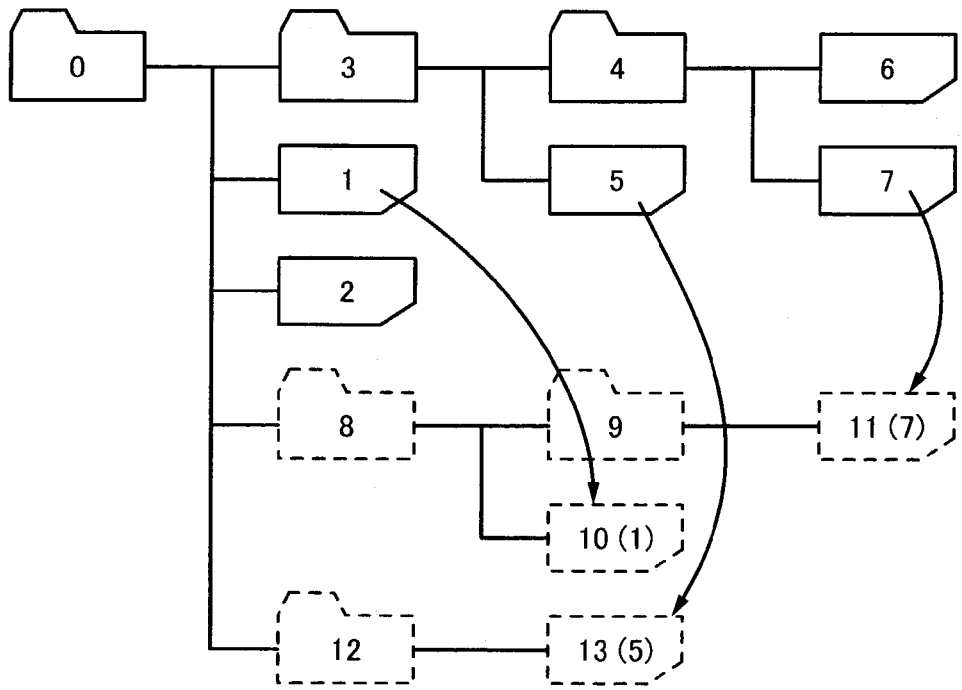
FIGS. 10A and 10B are schematic diagrams showing an example of information of a property and an example of the structure of index data.

FIGS. 10A and 10B are schematic diagrams showing an example of information of a property and structure of index data. FIG. 10A is a schematic diagram showing the relations of the entry number, the flag (0), the flag (1), and the folder property. FIG. 10B is a schematic diagram showing the structure of an index. In FIG. 10B, solid lines represent an original index, whereas dotted lines represent a favorite index.

The entry numbers 0 to 7 shown in FIGS. 10A and 10B are the same as those shown in FIGS. 9A and 9B except that the flag (1) is 0, which represents an original. Thus, their description will be omitted. In addition, the structure of the index data of the entry numbers 0 to 7 shown in FIG. 10B is the same as that shown in FIG. 9B.

When the entry number is 8, the flag (0) is 0, the flag (1) is 1, and the folder property is 0. Since flag (0) is 0, the entry number 8 is a folder. Since the flag (1) is 1, the entry number 8 is a favorite entry. Since the folder property is 0, the entry number 8 belongs to the entry number 0, which is a root.

When the entry number is 9, the flag (0) is 0, the flag (1) is 1, and the folder property is 8. Since the flag (0) is 0, the entry number 9 is a folder. Since the flag (1) is 1, the entry number 9 is a favorite entry. Since the folder property is 8, the entry number 9 belongs to the entry number 8, which is a folder.

When the entry number is 10, the flag (0) is 1, the flag (1) is 1, and the folder property is 8. Since the flag (0) is 1, the entry number 10 is index data. Since flag (1) is 1, the entry number 10 is a favorite entry. Since the folder property is 8, the entry number 10 belongs to the entry number 8, which is a folder.

When the entry number is 11, the flag (0) is 1, the flag (1) is 1, and the folder property is 9. Since the flag (0) is 1, the entry number 11 is index data. Since the flag (1) is 1, the entry number 11 is a favorite entry. Since the folder property is 9, the entry number 11 belongs to the entry number 9, which is a folder.

When the entry number is 12, the flag (0) is 0, the folder (1) is 1, and the folder property is 0. Since the flag (0) is 0, the entry number 12 is a folder. Since the flag (1) is 1, the entry number 12 is a favorite entry. Since the folder property is 0, the entry number 12 belongs to the entry number 0, which is a root folder.

When the entry number is 13, the flag (0) is 1, the flag (1) is 1, and the folder property is 12. Since the flag (0) is 1, the entry number 13 is index data. Since the flag (1) is 1, the entry number 13 is a favorite entry. Since the folder property is 12, the entry number 13 belongs to the entry number 12, which is a folder.

Thus, the entry number, flag (0), flag (1), and folder property shown in FIG. 10A represent that the index data has a hierarchical structure shown in FIG. 10B.

When the user wants to create his or hear favorite index, he or she creates a favorite folder to manage a group of entries he or she has selected as favorite entries. In FIGS. 10A and 10B, the user will create the folders of the entry numbers 8 and 12.

Next, the user selects entries he or she will register to the created favorite folders from the entries which have been registered. For example, in FIGS. 10A and 10B, the entry number 10 is a favorite entry created as a result of which the entry 1 has been selected. The entry number 11 is a favorite entry created as a result of which the entry number 7 has been selected. The entry number 13 is a favorite entry created as a result of which the entry number 5 has been selected.

The property data of the entries of the favorite index is copied from the property data of the selected entries. Other data is selected from only tracks which may be changed and then the selected data is copied.

Figure 11:
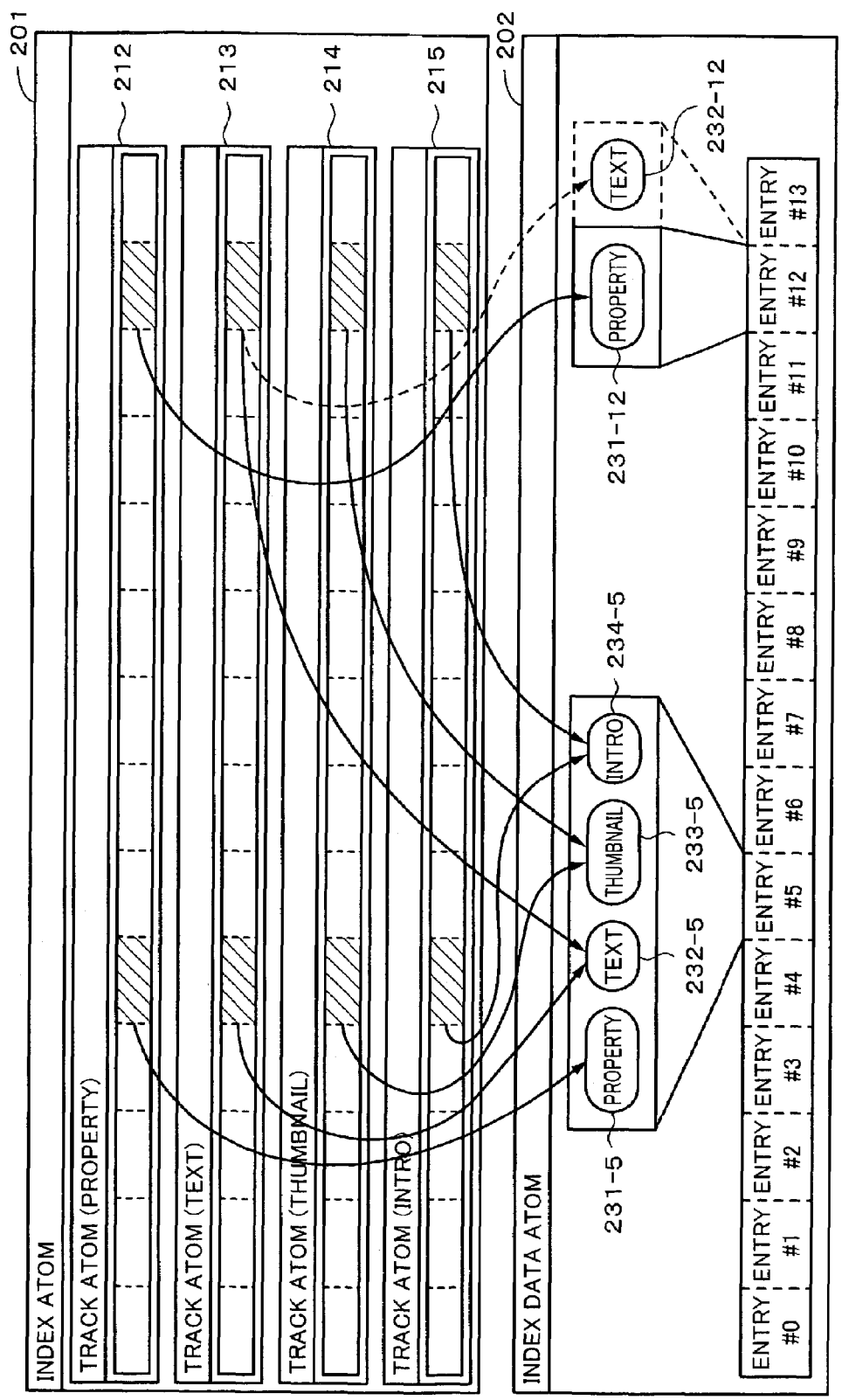
FIG. 11 is a schematic diagram showing a state that an entry of a favorite index references an entry of an original index.

FIG. 11 is a schematic diagram showing a state that an entry of a favorite index references an entry of an original index.

As shown in FIG. 11, the property information of the entry number 12 is copied from the entry number 5. The text data, thumbnail picture data, and intro data of the entry number 5 are referenced.

In FIG. 11, as denoted by a dotted line, without need to reference the selected original entry, text data may be contained in an entry of the favorite index. This applies to thumbnail picture data and intro data.

As a selecting method, a created favorite folder is displayed in the reproduction area 64-1, whereas original entries are displayed in the index area 64-2. The user drags his or her desired original entry to the favorite folder with the pointing device.

In the examples shown in FIGS. 10A, 10B, and 11, a favorite index is contained in the index file along with an original index. Alternatively, a favorite index may be contained in another file rather than the index file.

FIGS. 12A and 12B are schematic diagrams showing an example of which a favorite index is contained in another file.

FIG. 12A shows an original index, whereas FIG. 12B shows a favorite index.

When a favorite index is contained in another file rather than the original index file, an entry in which information which represents a favorite index file has been registered is contained in the original index file and an entry in which information which represents the original index file has been registered is contained in the favorite index file.

In FIGS. 12A and 12B, entry number 8 in which information which represents favorite index files 201-2 and 202-2 has been registered and entry number 9 in which information which represents favorite index files 201-3 and 202-3 has been registered are contained in original index files 201-1 and 202-1. Entry number 1 in which information which represents the original index files 201-1 and 202-1 has been registered is contained in the favorite index files 201-2 and 202-2. The entry number 1 in which information which represents the original index files 201-1 and 202-1 has been registered is contained in the favorite index files 201-3 and 202-3.

Information which represents a favorite index file and information which represents an original index file can be accomplished by combining a data type of a property and a file identifier.

In other words, the data type is defined as follows:
0: index file
1: moving picture
2: still picture
3: audio.

The file identifier contains the file name to be referenced.

For example, when the favorite index file 201-2 is referenced from the original index file 201-1, the data type of the property of the entry #8 is 0 and the file identifier contains the file name of the favorite index file 201-2. For example, when the original index file 201-1 is referenced from the favorite index file 201-3, the data type of the property of the entry number 1 is 0 and the file identifier contains the file name of the original index file 201-1.

When the index file has a multi-level hierarchical structure, the hierarchical levels may be defined and referenced upwards and downwards:
0: parent (upper hierarchical level) index file
1: child (lower hierarchical level) index file
2: moving picture
3: still picture
4: audio When the user selects the entry number 8 and the entry number 9 of the original index file, the system controlling microcomputer 19 starts the process for the favorite index files 201-2 and 202-2 and the favorite index files 201-3 and 202-3. When the user selects the entry number 1 of the index file, the system controlling microcomputer 19 starts the process for the original index files 201-1 and 202-1.

As was described above, in the same manner as another entry designates a movie file with the content of the property track, an original index file and a favorite index file are alternately referenced. However, such a structure can be accomplished by modifying file names without need to use such a QT reference structure. In other words, a file name is composed of an identification portion which represents an original index file or a favorite index file and another identification portion which represents whether or not an original index file and a favorite index file are alternately referenced.

For example, as a code which represents an original index file, "orgf" is used. As a code which represents a favorite index file, "favf" is used. As an identification portion which represents that an original index file and a favorite index file are alternately referenced, "seri" is used. In this case, the file name of an original index file is "orgfseri.mov." In contrast, the file name of a favorite index file is "favfseri.mov." When there are a plurality of favorite index files, numbers are used as a part of the file name. For example, as a first favorite index file, "fav1seri.mov" is used. As a second favorite index file, "fav2seri.mov" is used.

As was described above, since entries are identified by unique identifiers, the entries can be easily deleted and re-arranged.

FIGS. 13A, 13B, and 13C are schematic diagrams showing examples of which entries are deleted and re-arranged.

FIG. 13B is a schematic diagram showing the case that entry numbers 2, 6, and 10 are deleted from an index file shown in FIG. 13A. FIG. 13C is a schematic diagram showing the case that entry numbers 3 and 9 are re-arranged in the index file shown in FIG. 13B.

Even if entries are deleted or re-arranged, since entry numbers are identifiers unique to entries, the reference relation of the flag (0), the flag (1), and the folder property does not vary. Thus, it is not necessary to change these values when entry numbers are deleted or re-arranged.

A track atom (text) 213 has a format of a table which correlates text data #1, text data #2, . . . text data #n defined as chunks of data of character strings corresponding to a disc title and each AV file, data lengths L_TX1, L_TX2, . . . , L_TXn, and start byte positions 0, L_TX1, L_TX1+L_TX2, . . . , L_TX1 + . . . +L_TXn−1. The data length is for example a variable length in the unit of a byte.

A track atom (thumbnail) 214 has a format of a table which correlates thumbnail data #1, thumbnail data #2, . . . , thumbnail data #n defined as chunks of data of thumbnails of a disc title and each AV file, data lengths L_TH1, L_TH2, . . . , L_THn, and start byte positions 0, L_TH1, L_TH1+L_TH2, . . . , L_TH1+L_THn−1. The data length is for example a variable length in the unit of a byte.

A track atom (intro) 215 has a format of a table that correlates intro data #1, intro data #2, intro data #n defined as chunks of data of intros of a disc title and each AV file, data lengths L_IN1, L_IN2, . . . , L_INn, and start byte positions 0, L_IN1, L_IN1+L_IN2, . . . , L_IN1+ . . . +L_INn−1. The data length of each of the track atom (text) 213, the track atom (thumbnail) 214, and the track atom (215) is for example a variable length in the unit of a byte.

Information about an entry of a folder can be described in the track atom (text) 213, the track atom (thumbnail) 214, and the track atom (intro) 215. Thus, text data, thumbnail picture data, and intro data can be contained in entries of a folder of the index data atom 202. Consequently, thumbnail picture data, text data, or intro data can be contained in a folder.

For example, when the user wants to record events which happened in a travel and categorize them corresponding to countries he or she visited, by creating folders corresponding to the countries and using texts of the folders, he or she can assign the country names he or she visited to the individual folders. As a result, with test data of folders the camera integrated recording and reproducing apparatus displays, the user can easily grasp the contents of the folders. For example, a character string "Turkey" is stored as text data of a folder which contains a plurality of files in which scenes were recorded when the user traveled Turkey. As another example, a character string "Macedonia" is stored as text data of a folder which contains a plurality of files in which scenes were recorded when the user traveled Macedonia.

Next, a process for a recording medium on which such an index file has been recorded will be described.

Figure 14:
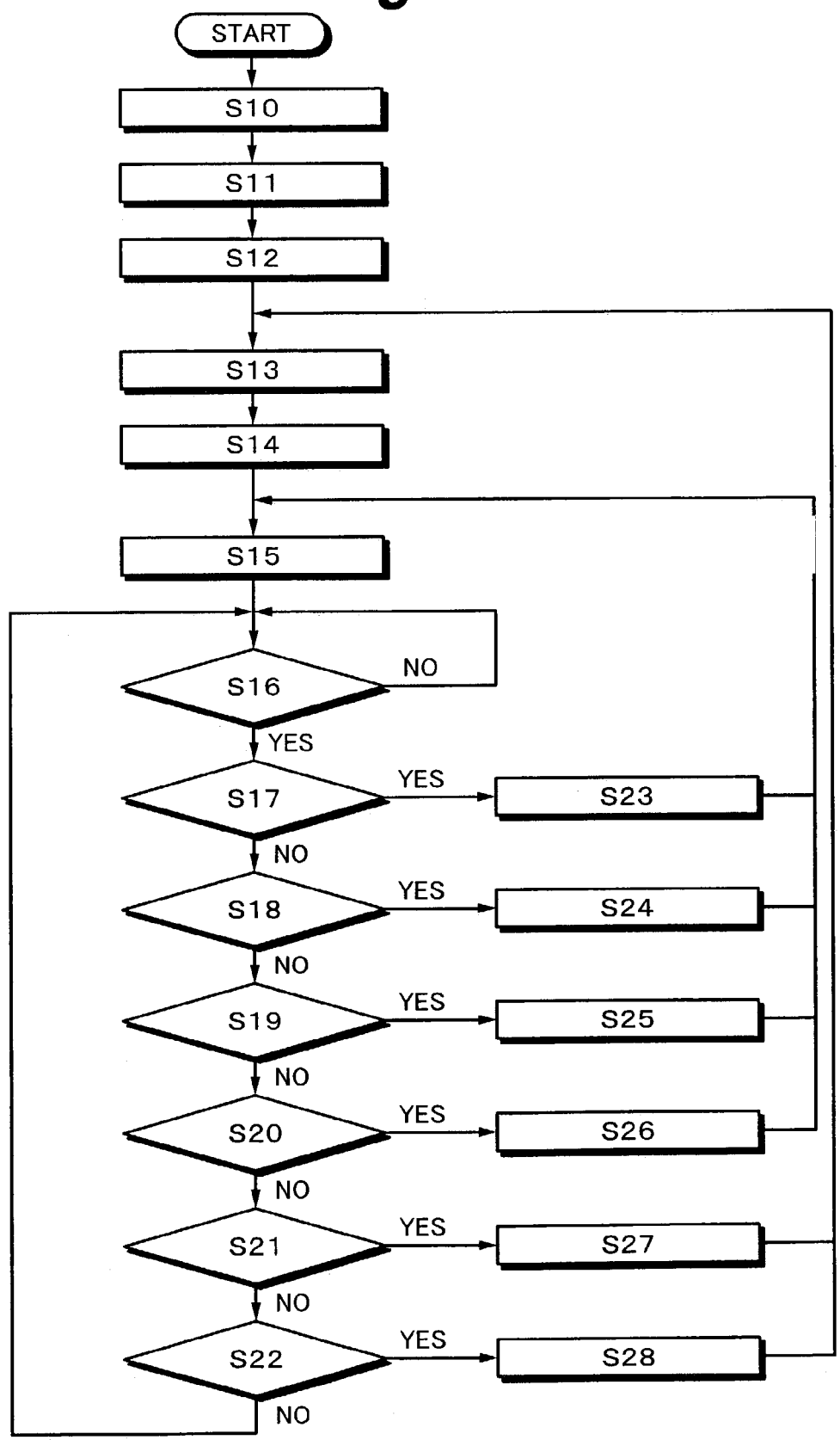
FIG. 14 is a flow chart for explaining an operation of a system controlling microcomputer.

FIG. 14 is a flow chart for explaining an operation of the system controlling microcomputer.

When a recording medium 40 on which an index file has been recorded is inserted into the camera integrated digital recording and reproducing apparatus 50, the system controlling microcomputer 19 thereof initializes variable a to 0 (at step S10). While the program is being executed, the value of the flag (0) is stored in the variable a. With reference to the variable a, the system controlling microcomputer 19 determines whether or not an index to be displayed in the index area 64-2 is original index data or favorite index data.

Thereafter, the system controlling microcomputer 19 reads the index file (at step S11).

Thereafter, with reference to the folder property of each entry, the system controlling microcomputer 19 searches for an entry whose folder property is "T." Thereafter, the system controlling microcomputer 19 displays the content of the entry whose folder property is "T" as a disc title in the reproduction area 64-1 (at step S12).

When the disc title is contained in the top entry of the index file, the search time can be shortened.

Thereafter, the system controlling microcomputer 19 initialize variable F to 0 (at step S13). While the program is being executed, the variable F stores the value of the folder property. The system controlling microcomputer 19 determines a folder to which the entry belongs.

Thereafter, the system controlling microcomputer 19 allocates a history area for storing the history on the memory 17 and initializes the history area (at step S14).

Thereafter, the system controlling microcomputer 19 displays an entry whose folder property is the variable F and whose flag (1) is the variable a in the index area 64-2 (at step S15).

In this case, since F=0 & a=0, the system controlling microcomputer 19 displays the content of an entry which belongs to the root and which is contained in the original index in the index area 64-2. For example, the system controlling microcomputer 19 reproduces the contents (text data, thumbnail picture data, or intro data) of the entry number 1, the entry number 2, and the entry number 3 shown in FIG. 10.

Thereafter, the system controlling microcomputer 19 determines whether or not the user has input a command on the display panel 54 with the pointing device 55 (at step S16). When the determined result represents that the user has input a command, the flow advances to step S17. When the determined result represents that the user has not input a command, the flow returns to step S16.

Thereafter, the system controlling microcomputer 19 determines whether or not the displayed content is a selection of "file" (at step S17). The system controlling microcomputer 19 executes the selection of "file" when the user presses the index data displayed in the index area 64-2 with the pointing device 55. This operation applies to a selection of "folder" which will be described later. When the determined result represents that the input command is the selection of "file", the system controlling microcomputer 19 reproduces an AV file of the selected index file (at step S23). Thereafter, the flow returns to step S15. When the determined result represents that the input command is not the selection of "file," the flow advances to step S18.

By pressing the reproduction area 64-1 with the pointing device 55, the reproduction area can be widened to the entire display portion 64. Alternatively, by dragging the boundary of the reproduction area 64-1 and the index area 64-2 with the pointing device 55, the reproduction area can be widened.

Thereafter, the system controlling microcomputer 19 determines whether or not the input command is the selection of "folder" (at step S18). When the determined result represents that the input command is the selection of "folder," the system controlling microcomputer 19 substitutes the entry number of the selected folder for the variable F and stores the value of the variable F in the history area (at step S24). Thereafter, the flow returns to step S15. When the determined result represents that the input command is not the selection of "folder," the flow advances to step S19.

Thereafter, the system controlling microcomputer 19 determines whether the input command is the selection of "previous folder" (at step S19). When the determined result represents that the input command is the selection of "previous folder", with reference to the history of the memory 17, the system controlling microcomputer 19 substitutes an entry number of a folder which is earlier by one than a folder which has been currently selected for the variable F (at step S25). Thereafter, the flow returns to step S15. When the determined result represents that the input command is not the selection of "previous folder," the flow advances to step S20.

Thereafter, the system controlling microcomputer 19 determines whether or not the input command is the selection of "next folder" (at step S20). When the determined result represents that the input command is the selection of "next folder," with reference to the history of the memory 17, the system controlling microcomputer 19 substitutes an entry number of a folder which is earlier by one than a folder which has been currently selected for the variable F (at step S26). Thereafter, the flow returns to step S15. When the determined result represents that the input command is not the selection of "next folder," the flow advances to step S21.

Thereafter, the system controlling microcomputer 19 determines whether or not the input command is the selection of "favorite" (at step S21). When the determined result represents that the input command is the selection of "favorite," the system controlling microcomputer 19 substitutes 1 for the variable a (at step S23). Thereafter, the flow returns to step S15. Thus, at step S15, the system controlling microcomputer 19 displays data of the entry of the favorite index in the index area 64-2. When the determined result represents that the input command is not the selection of "favorite," the flow advances to step S22.

Thereafter, the system controlling microcomputer 19 determines whether or not the input command is the cancellation of "favorite" (at step S22). When the determined result represents that the input command is the cancellation of "favorite", the system controlling microcomputer 19 substitutes 0 for the variable a (at step S28). Thereafter, the flow returns to step S15. Thus, at step S15, the system controlling microcomputer 19 displays data of an entry of the original index rather than a favorite index in the index area 64-2. When the determined result represents that the input command is not the cancellation of "favorite," the flow returns to step S16. At step S16, the system controlling microcomputer 19 waits for the next command.

When the recording medium 50 is inserted into the camera integrated digital recording and reproducing apparatus 50 according to the embodiment, with reference to an index file, the digital recording and reproducing apparatus with built-in camera 50 displays the index data in a hierarchical structure. Thus, a plurality of files recorded on the recording medium 40 can be easily and quickly searched for a desired file.

Since the recording apparatus, the recording method, the recording medium, and the electronic camera having the recording apparatus according to the present invention use an index file in a hierarchical structure, they can manage a collection of pieces of index information corresponding to each common factor. The recording apparatus and so forth according to the present invention can create a favorite index for managing index information corresponding to user's purpose along with index information managed in the hierarchical structure.

The invention claimed is:

1. A recording apparatus comprising:
an operating portion for receiving a predetermined input command from a user, the operating portion having a display portion for displaying a reproduced picture and an index portion for displaying index data,
wherein the predetermined input command includes enabling a user to select a previous folder in a hierarchy in the display portion, select a next folder in the hierarchy in the display portion, and change the index portion between displaying an original data hierarchy or a favorite information hierarchy;

creating means for creating an index file having a plurality of areas assigned unique identifiers respectively; and recording means for recording the index file to a recording medium, wherein the creating means is correlatively storing a plurality of files recorded on the recording mediums and a plurality of pieces of excerpted information thereof to the plurality of areas, wherein each of the areas contains attribute information having first information and second information, the first information identifying whether the area is a folder for storing a collection of pieces of the excerpted information or stores at least a piece of the excerpted information, the second information representing a folder to which the area belongs, and wherein the attribute information has third information, the third information identifying whether the area contains at least a piece of the excerpted information or favorite information, the favorite information referencing at least a piece of the excerpted information.

2. The recording apparatus as set forth in claim 1, further comprising:

recording medium identification information storing means for storing identification information in the index file in the same format as the index file, the identification information identifying the recording storage medium.

3. The recording apparatus as set forth in claim 1, wherein each piece of the excerpted information is picture data of one of the files recorded on the storage medium.

4. The recording apparatus as set forth in claim 1, wherein each piece of the excerpted information is audio data of one of the files recorded on the recording storage medium.

5. The recording apparatus as set forth in claim 1, wherein each piece of the excerpted information is text data of one of the files recorded on the recording storage medium.

6. A recording apparatus comprising:

creating means for creating an index file having a plurality of areas assigned unique identifiers respectively; and recording means for recording the index file to a recording medium, wherein the creating means is correlatively storing a plurality of files recorded on the recording mediums and a plurality of pieces of excerpted information thereof to the plurality of areas, wherein each of tile areas contains attribute information having first information and second information, the first information identifying whether the area is a folder for storing a collection of pieces of the excerpted information or stores at least a piece of the excerpted information, the second information representing a folder to which the area belongs, wherein the attribute information has third information, the third information identifying whether the area contains at least a piece of the excerpted information or favorite information, the favorite information referencing at least a piece of the excerpted information, and wherein the index file has:

a first area composed of a set of pieces of the excerpted information; and a second area in which information for correlating the plurality of pieces of the excerpted information and files from which the pieces of the excerpted information have been excerpted and information representing positions at which the pieces of the excerpted information have been recorded in the first area are recorded.

7. A recording method performed by a recording device, the method comprising:

receiving a predetermined input command from a user through an operating portion having a display portion for displaying a reproduced picture and an index portion for displaying index data, wherein the predetermined input command includes enabling a user to select a previous folder in a hierarchy in the display portion, select a next folder in the hierarchy in the display portion, and change the index portion between displaying an original data hierarchy or a favorite information hierarchy;

correlatively storing a plurality of files recorded on a recording storage medium and a plurality of pieces of excerpted information thereof to a plurality of areas assigned unique identifiers;

creating an index file which stores attribute information having first information and second information, the first information identifying whether each of the areas is a folder or stores a piece of the excerpted information, the second information representing a folder to which the area belongs; and recording the created index file to the recording medium, wherein the attribute information has third information, the third information identifying whether the area contains at least a piece of the excerpted information or favorite information, the favorite information referencing at least a piece of the excerpted information.

8. An electronic camera, comprising:

an operating portion for receiving a predetermined input command from a user, the operating portion having a display portion for displaying a reproduced picture and an index portion for displaying index data, wherein the predetermined input command includes enabling a user to select a previous folder in a hierarchy in the display portion, select a next folder in the hierarchy in the display portion, and change the index portion between displaying an original data hierarchy or a favorite information hierarchy:

creating means for creating an index file composed of a plurality of areas assigned unique identifiers; and recording means for recording a picture signal as a file which is obtained from a photographed picture of an object and the index file to the recording medium, wherein the creating means is correlatively storing a plurality of files recorded on the recording medium and a plurality of pieces of excerpted information thereof to the plurality of areas, wherein each of the areas contains attribute information having first information and second information, the first information identifying whether the area is a folder or stores a piece of the excerpted information, the second information representing a folder to which the area belongs, and wherein the attribute information has third information, the third information identifying whether the area contains at least a piece of the excerpted information or favorite information, the favorite information referencing at least a piece of the excerpted information.

* * * * *